Sept. 8, 1931. Y. H. KURKJIAN 1,822,443
BEAD FORMING DEVICE
Filed Feb. 7, 1929 5 Sheets-Sheet 2

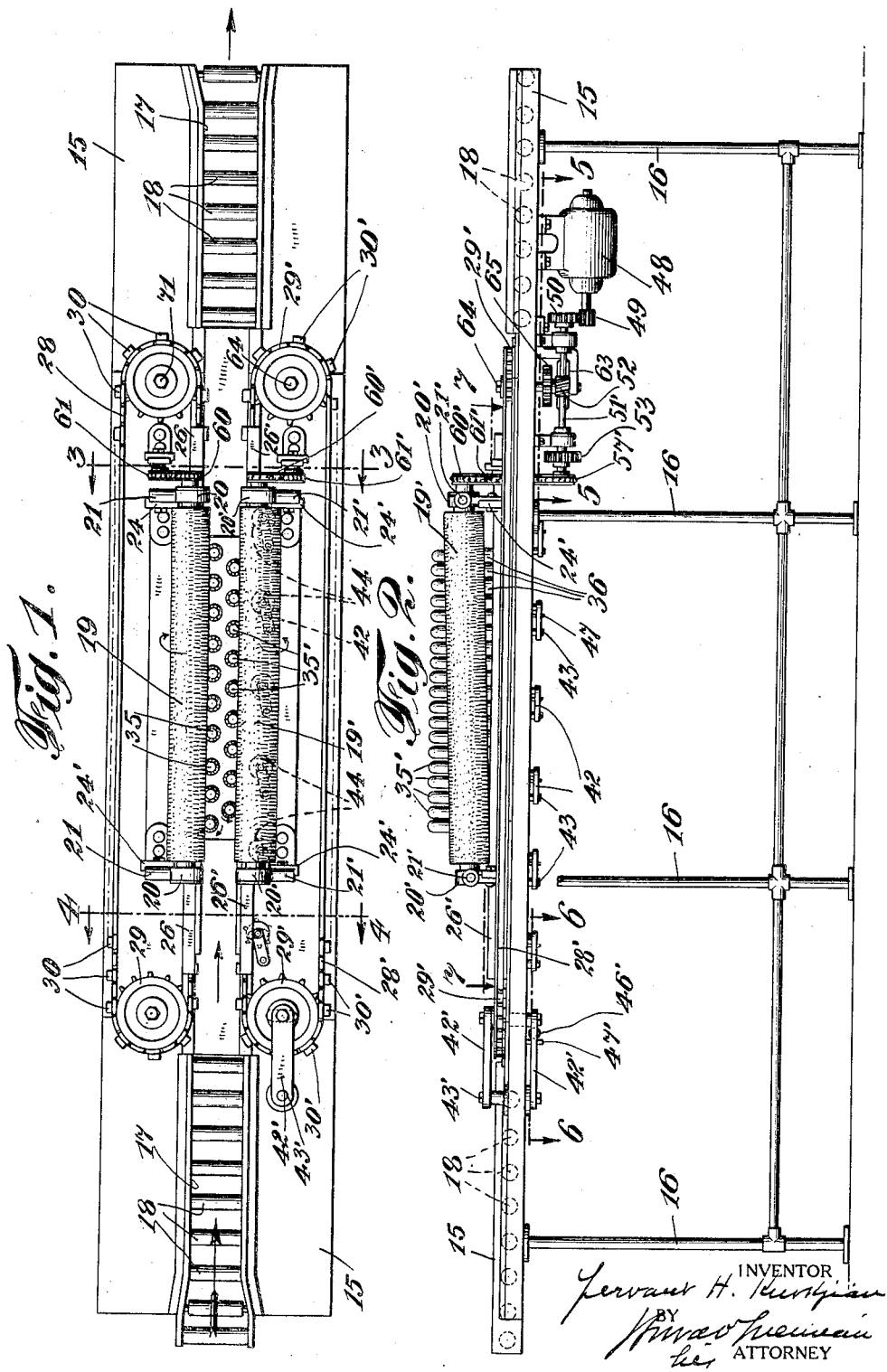

INVENTOR
Yervant H. Kurkjian
BY
ATTORNEY

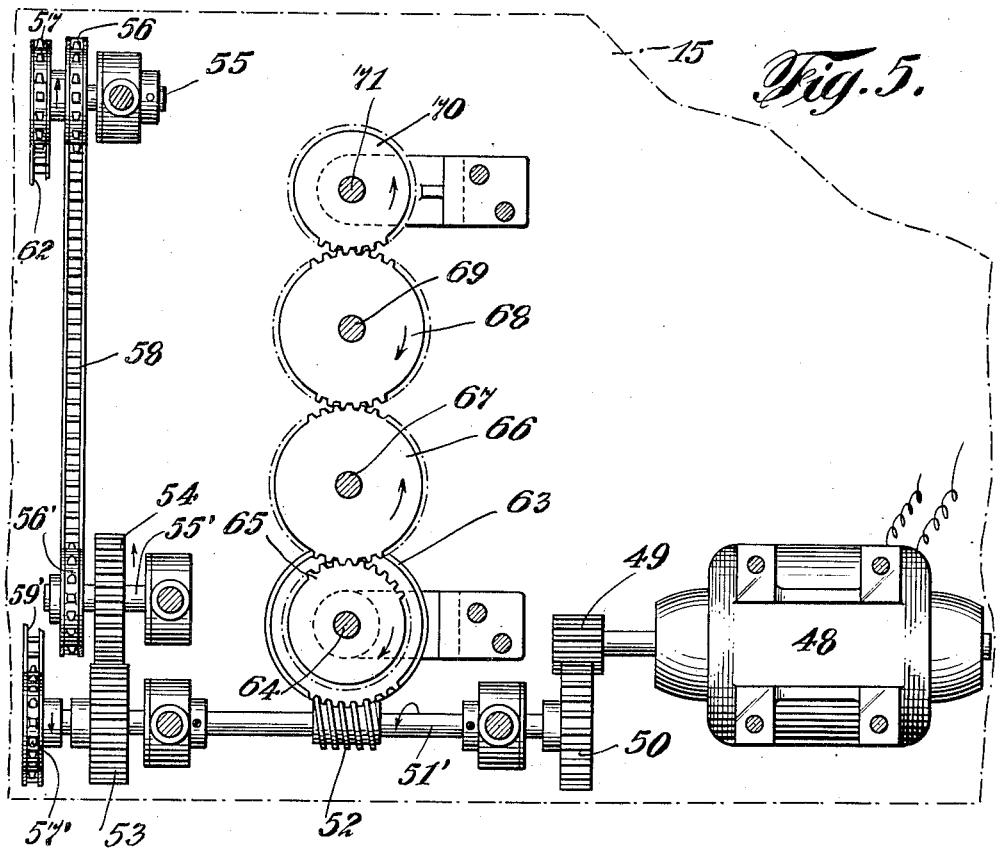
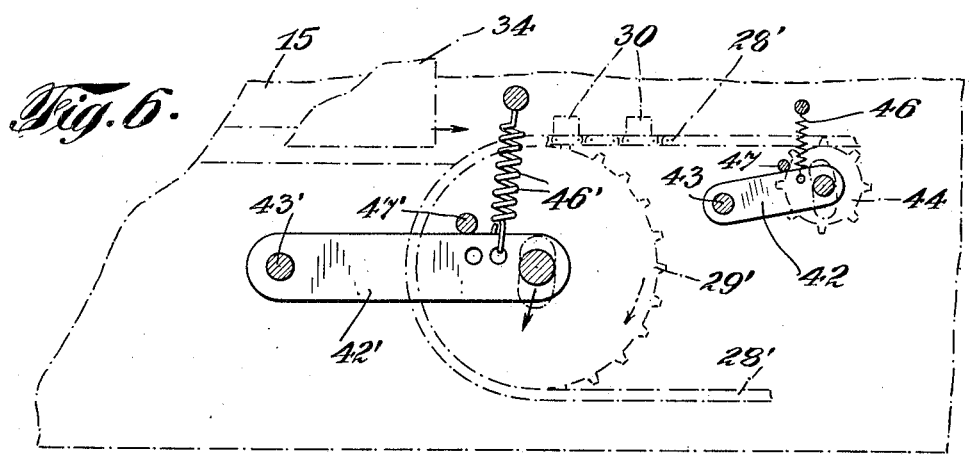

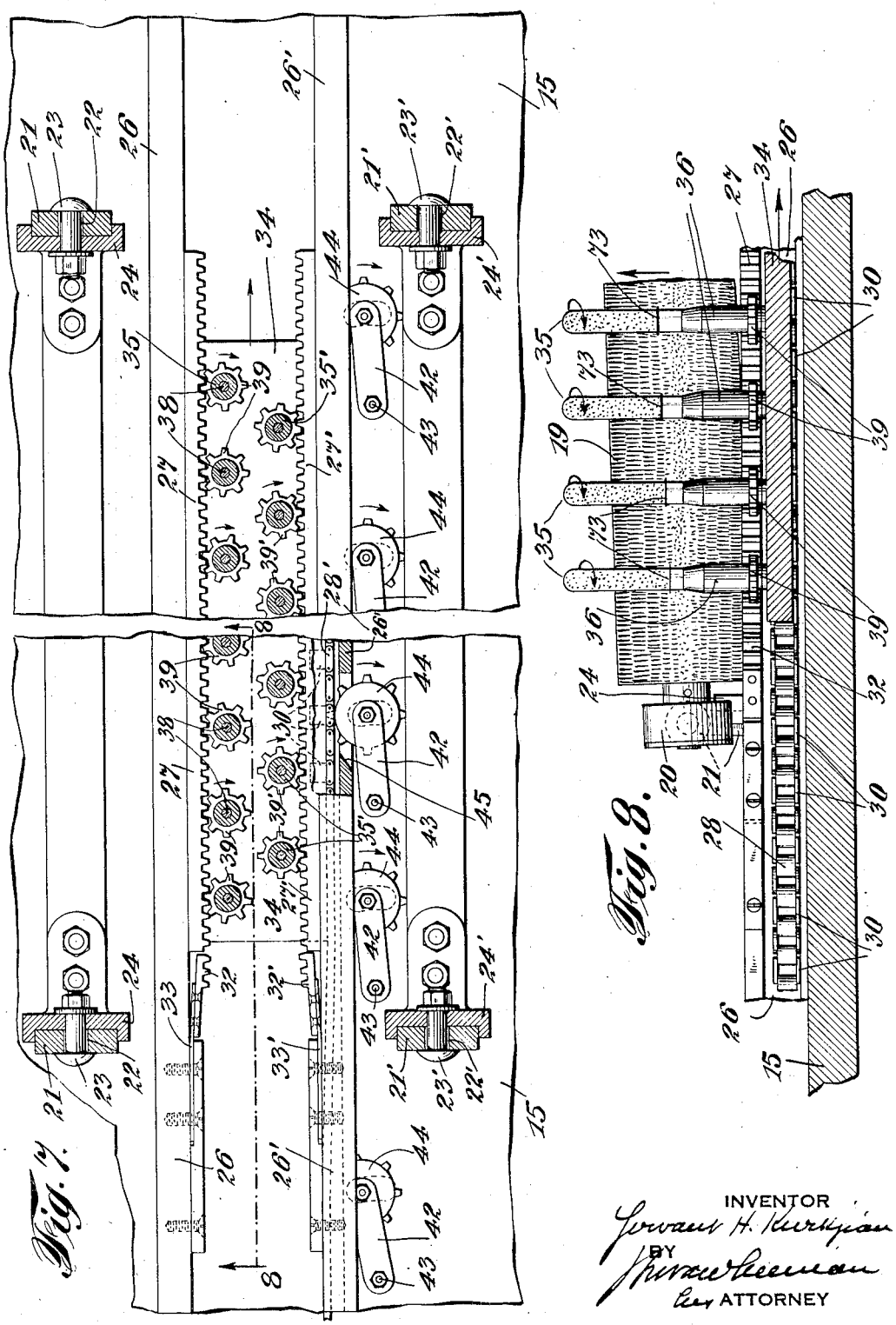

Sept. 8, 1931.  Y. H. KURKJIAN  1,822,443
BEAD FORMING DEVICE
Filed Feb. 7, 1929    5 Sheets-Sheet 5
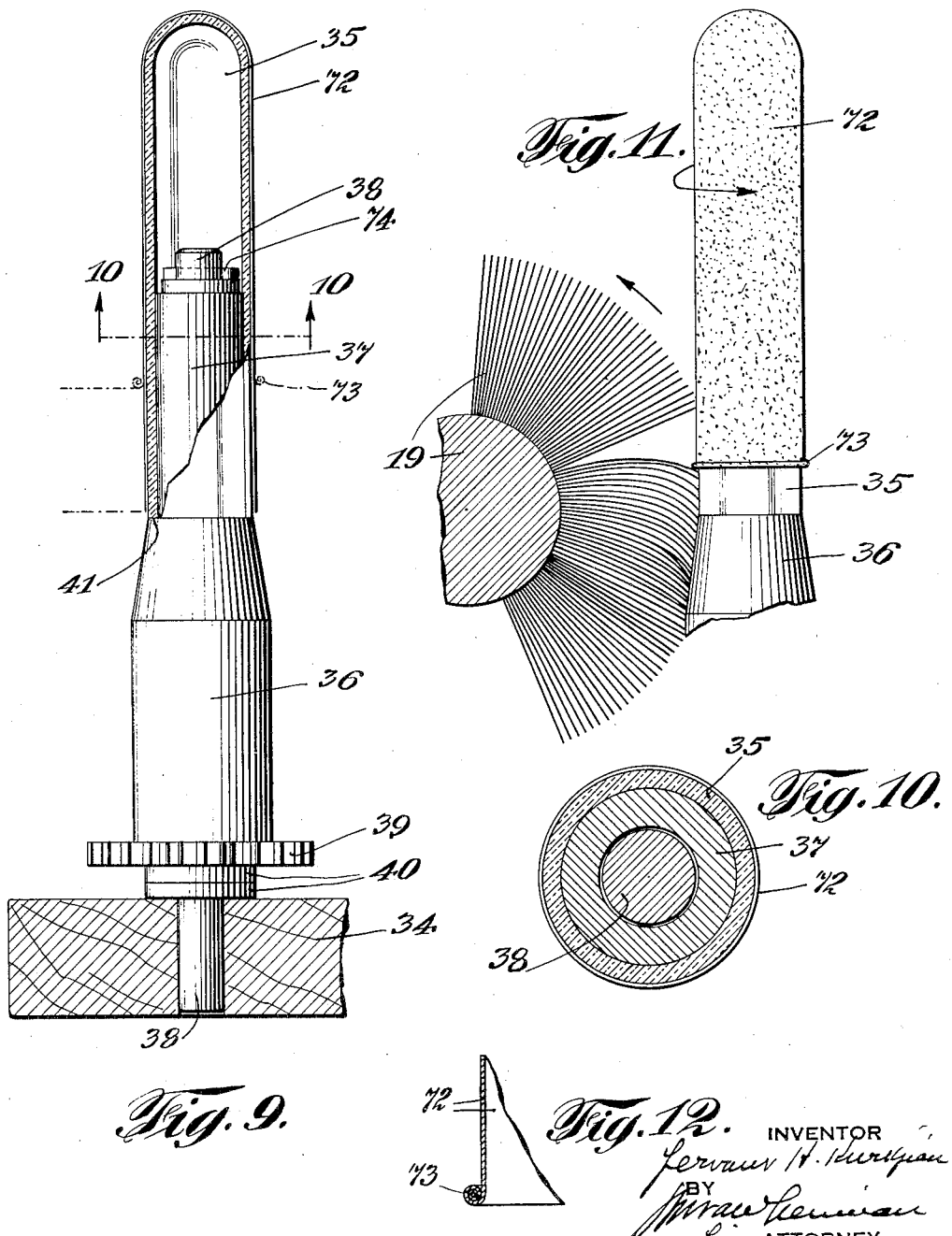

Patented Sept. 8, 1931

1,822,443

UNITED STATES PATENT OFFICE

YERVANT H. KURKJIAN, OF HAWTHORNE, NEW JERSEY, ASSIGNOR TO CARL J. SCHMID, INC., OF NEW YORK, N. Y., A CORPORATION OF NEW JERSEY

BEAD FORMING DEVICE

Application filed February 7, 1929. Serial No. 338,246.

My invention relates to bead forming devices and refers particularly to devices adapted for forming beads upon the open ends of rubber articles such as balloons, finger cots and similar devices.

Rubber articles of the character mentioned are generally produced by depositing a thin film of rubber upon a form, usually of glass, of the general shape of the desired article. In order to prevent the device from tearing a bead is formed upon the lower edge of the film form by rolling the lower portion of the film upon itself and the device of my invention is directed to means for accomplishing this result in an accurate and economical manner.

The many advantages of my device will be evident upon a consideration of my specification and accompanying drawings which illustrate one definite form of my device, my invention, however, not being confined to the particular mechanical construction thus shown and described.

In the accompanying drawings, illustrating one form of the device of my invention similar parts are designated by similar numerals.

Fig. 1 is a top view of one form of my device.

Figure 2 is a side view of the device of Figure 1.

Figure 5 is a section through the line 5—5 of Figure 2.

Figure 6 is a section through the line 6—6 of Figure 2.

Figure 7 is a section through the line 7—7 of Figure 2.

Figure 8 is a section through the line 8—8 of Figure 7.

Figure 9 is a side view, partly in section, of the former shown in the accompanying drawings.

Figure 10 is a section through the line 10—10 of Figure 9.

Figure 11 is a side view illustrating the brush action in forming a bead.

Figure 12 is a section showing the construction of the bead.

Figure 3:
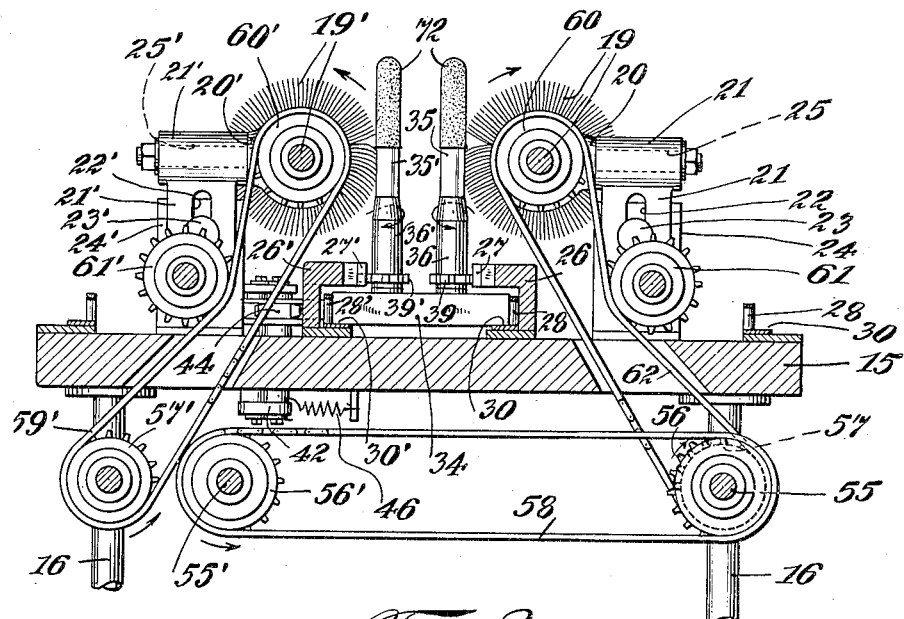
Figure 3 is a section through the line 3—3 of Figure 1.
Figure 4:
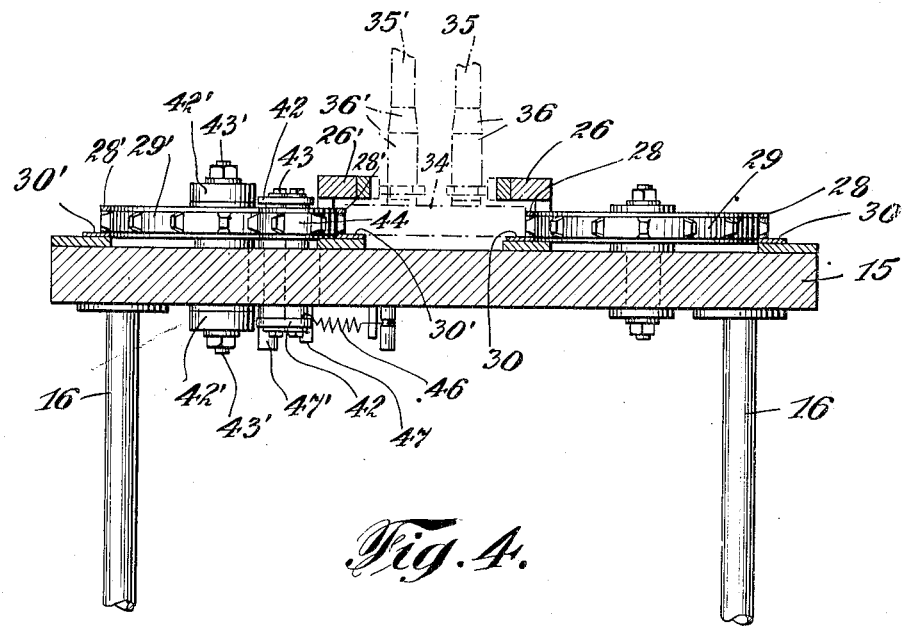
Figure 4 is a section through the line 4—4 of Figure 1.

The particular form of the device of my invention illustrated in the accompanying drawings comprises a table 15 supported by a plurality of legs 16, 16, 16. A portion 17 of each end of the table 15 is cut away for purposes described later, a plurality of idlers 18, 18 being positioned transversely of these cut out portions.

A revoluble brush carrying shaft 19, is revoluble in the bearings 20, 20 carried by the supports 21, 21. Each support 21 has a vertical slot 22, a set-bolt 23 passing through said slot and through an opening in the support 24, the latter being fixedly attached to the table 15. The stub-shaft 25 carries the brush 19 which is revoluble within the bearing 20. By these means the brush 19 may be lowered and raised to any desired position. It is to be noted that the axis of the brush 19 is positioned angularly to the top of the table 15.

The device contains a revoluble brush 19′ which is supported and arrayed as the brush 19, the several corresponding parts being designated by corresponding prime numerals.

A run-way is formed by the two U-shaped members 26 and 26′, a portion of the inwardly extended upper part of each member 26 and 26′ carrying a rack 27 and 27′.

An endless chain 28 passes around the two sprockets 29, 29, each link of the chain having an outwardly extended support member 30.

At opposite sides of the entrance portions of the two rigid racks 27 and 27′ are two resilient racks 32 and 32′ having springs 33 and 33′ fixedly attached to the resilient racks 32 and 32′ and the members 26 and 26′.

Movable within the run-way formed by the U-shaped members 26 and 26′ is a former platform 34, adapted to carry a plurality of formers 35, 35′. The particular form of formers and holding means shown in the accompanying drawings comprises a wooden support having the annular base 36 and the reduced top portion 37. The wooden-support 36-37 is revoluble upon the shaft 38 passing through a vertically central opening in the wooden support. A pinion 39 is fixedly attached to the wooden-support base 36. The lower end of the shaft 38 is inserted into a hole within the platform 34, and a cotter pin 74 passing through the upper portion of the shaft 38 and the two washers 40, 40 effect a construction in which the wooden-support 36–37 is revolved by the revolution of the pinion 39, the device being maintained in upright position. The glass former 35 rests upon the shoulder 41 of the wooden-support and is revoluble therewith.

The teeth of the two series of pinions 39, 39, 39', 39' are insertable within the racks 27, 32 and 27', 32', so that a movement of the platform 34 within the run-way, will revolve the pinions 39, 39, 39', 39' with their attached formers 35, 35'.

It will be noted that the platform 34 rests upon the chain support members 30, 30' and hence, will have a tendency to move with the chain. In order, however, to insure a uniform and continuous movement of the platform with the chain, the following means are employed upon one side of the device:—

A plurality of pivotal links 42, 42 are pivotally attached at 43 to the table 15. Each link 42 carries a sprocket 44 capable of co-acting with the links of the chain 28 through a series of corresponding cut-outs 45, 45. A spiral spring 46 has a tendency to move each sprocket 44 toward the chain 28, this inward movement being limited by the stop-pin 47. The end sprocket upon the same side of the device and at the entrance end thereof, is similarly pivotally carried as shown particularly in Figure 6, corresponding parts being designated by corresponding prime numerals.

This construction has a tendency to move the chain inwardly upon one side of the device thus forcing it firmly against the side of the platform 34 and insuring its movement by the chain.

The motive means of the illustrated device is as follows:—

The motor 48 revolves the gear 49 which is meshed with the gear 50 carried by the shaft 51' having the worm gear portion 52. The shaft 51 also carries the fixedly attached gear 53 meshed with the gear 54 fixedly attached to the stub shaft 55' which carries the fixedly attached sprocket 56'. The shaft 51' carries also the fixedly attached sprocket 57'. A stub shaft 55 carries the fixedly attached sprockets 56 and 57. A link chain 58 connects the sprockets 56 and 56'. The chain 59' connects the sprocket 57' with the sprocket 60' fixedly attached to the shaft 19'. An idler sprocket 61' acts to keep the chain 59' in taut condition.

A link chain 62 connects the sprocket 57 with the sprocket 60 fixedly attached to the shaft 19. An idler sprocket 61 acts to keep the chain 62 in taut condition.

The worm 52 meshes with the worm gear 63 carried by the revoluble shaft 64 which also carries the gear 65 and the sprocket 29'. The gear 65 meshes with the intermediate gear 66 carried by the revoluble shaft 67 and in turn meshes with the gear 68 carried by the revoluble shaft 69. The gear 68 meshes with the gear 70 carried by the shaft 71 which also carries the sprocket 29. Thus the two sprockets 29 and 29' are revolved causing the chains 28 and 28' to move.

The operation of the device is as follows:—

The mechanism is put into motion, revolving the brushes 19 and 19', and moving the chains 28 and 28'. A platform 34 carrying a plurality of formers 35 and their attached parts is placed upon the roller idlers 18, 18 at the left end portion of Figure 1 and pushed inwardly until the platform 34 is gripped by the moving link chains 28 and 28' which carry the platform 34 forwardly. During this movement the pinions 39, 39' of the formers first engage the resilient racks 32 and 32' thus giving the formers a rotary movement which is continued by the further engagement of the pinions 39, 39' with the fixed racks 27 and 27'. Previous to its introduction into the above device the platform 34 has been reversed so that the attached formers 35, 35' are directed downwardly and the formers 35, 35' immersed into a solution of rubber or other suitable material which will form a film 72 upon the exterior face of each former. The platform, with its attached formers, is then removed and the deposited film allowed to set, or become sufficiently dry and elastic to allow of the operations which are to follow.

During the forward and revoluble movement of the formers 35, 35' each with its film covering 72, the brushes 19 and 19' have an upwardly revoluble abutment upon the outer surface thereof, the brushes being so positioned with respect to their height from, and angular position to, the table top 15, that the bristles of said brushes will gradually force the film 72 upwardly with a rolling motion forming a bead 73 around the open end of the cylindrical film covering 72.

The platform with its beaded films then moves outwardly over the idlers 18, 18 at the exit end of the machine and the films stripped from the formers by any suitable means.

Among the many advantages of my device the following may be noted:—

By means of my platform 34 carrying a plurality of formers, the number of operations are very naturally reduced, as a number of formers may be dipped at one time, they may be dried without individual handling, they may all be introduced into my device at the same time, they may all be beaded at the same time, removed at the same time and subjected to the further treatment at the same time, all of these operations being conducted as readily and as rapidly for the plurality of formers as it would otherwise require for a single one.

By means of the resilient racks 32 and 32', the formers are not given a sudden movement at the commencement of their revolution, thus overcoming the breaking of the glass formers and their loosening from their sockets incident to the present known devices.

By means of the raising and lowering elements operative upon the revoluble brushes, these brushes can be so positioned as to form the bead upon the film any desired distance from the closed end of the film, thus allowing the production of any desired length of film upon a single standard size of former.

By means of the special form of my chain attachment devices a positive contact is formed between the moving chains and the platform thus insuring a constant regular movement of the formers along the brushes.

While I show two rows of formers and two brushes, it is evident that a single row of formers and a single brush may be employed.

The above-mentioned, and other, valuable features of my device are not found in the present known devices, and hence, my device has great practical and commercial values.

I do not limit myself to the particular size, shape, number, arrangement or material of parts as shown and described as these are given simply as a means for clearly explaining the device of my invention.

What I claim is:—

1. In a bead forming device in combination, a supporting frame, a removable platform movable longitudinally of said frame, a plurality of extended revoluble formers carried by said platform, a pinion carried by each of said formers, a revoluble inclined elongated brush carried longitudinally upon said frame and abuttable upon said formers during the passage of said formers along the face of said brush, means for revolving said brush, a rack extending the length of said brush meshable with said former pinions causing the revolution of said former pinions during the passage of said formers along the face of said brush, means for varying the height and inclination of said brush and means for fixing said brush in said varying positions of height and inclination.

2. In a bead forming device, in combination, a movable platform a plurality of extended revoluble formers carried by said platform, a run-way within which said platform is movable, fixed means carried by said run-way revolving said formers when said platform is moved within said run-way, means for moving said platform, a revoluble inclined brush abuttable upon said formers during the passage of said platform through said run-way, means for revolving said brush, means for varying the height and inclination of said brush and means for fixing said brush in said varying positions of height and inclination.

3. In a bead forming device, in combination, a movable platform, a plurality of extended revoluble formers carried by said platform, a run-way within which said platform is movable, a pinion carried by each said former, a fixed rack carried by said run-way meshable with said pinions revolving said formers when said platform is moved within said run-way, means for moving said platform, a revoluble inclined brush abuttable upon said formers during the passage of said platform through said run-way, means for revolving said brush, means for varying the height and inclination of said brush and means for fixing said brush in said varying positions of height and inclination.

4. In a bead forming device, in combination, a movable platform, a plurality of extended revoluble formers carried by said platform, a run-way within which said platform is movable, fixed means carried by said run-way revolving said formers when said platform is moved within said run-way, means for moving said platform, a plurality of oppositely positioned inclined brushes abuttable upon said formers during the passage of said platform through said run-way, means for revolving said brushes, means for varying the height and inclination of said brushes and means for fixing said brushes in said varying positions of height and inclination.

5. In a bead forming device, in combination, a movable platform, a plurality of extended revoluble formers carried by said platform, a run-way within which said platform is movable, a pinion carried by each said former, a fixed rack carried by said run-way meshable with said pinions revolving said formers when said platform is moved within said run-way, means for moving said platform, a plurality of oppositely positioned inclined brushes abuttable upon said formers during the passage of said platform through said run-way, means for revolving said brushes, means for varying the height and inclination of said brushes and means for fixing said brushes in said varying positions of height and inclination.

6. In a bead forming device, in combination, a movable platform, a plurality of extended revoluble formers carried by said platform, a run-way within which said platform is movable, a pinion carried by each said former, resilient racks carried by said run-way meshable with said pinions revolving said formers when said platform is moved within said run-way, means for moving said platform, a revoluble inclined brush abuttable upon said formers during the passage of said platform through said run-way and means for revolving said brush.

7. In a bead forming device, in combination, a movable platform, a plurality of extended revoluble formers carried by said platform, a run-way within which said platform is movable, a pinion carried by each said former, resilient racks carried by said run-way meshable with said pinions revolving said formers when said platform is moved within said run-way, fixed racks carried by said run-way meshable with said pinions revolving said formers when said platform is moved within said run-way, means for moving said platform, a revoluble inclined brush abuttable upon said formers during the passage of said platform through said run-way and means for revolving said brush.

8. In a bead forming device, in combination, a movable platform, a plurality of extended revoluble formers carried by said platform, a run-way within which said platform is movable, a pinion carried by each said former, resilient racks carried by said run-way meshable with said pinions revolving said formers when said platform is moved within said run-way, means for moving said platform, a revoluble inclined brush abuttable upon said formers during the passage of said platform through said run-way, means for revolving said brush, means for varying the height and inclination of said brush and means for fixing said brush in said varying positions of height and inclination.

9. In a bead forming device, in combination, a movable platform, a plurality of extended revoluble formers carried by said platform, a run-way within which said platform is movable, a pinion carried by each said former, resilient racks carried by said run-way meshable with said pinions revolving said formers when said platform is moved within said run-way, fixed racks carried by said run-way meshable pinions revolving said formers when said platform is moved within said run-way, means for moving said platform, a resilient inclined brush abuttable upon said formers during the passage of said platform through said run-way, means for revolving said brush, means for varying the height and inclination of said brush and means for fixing said brush in said varying positions of height and inclination.

10. In a bead forming device, in combination, a movable platform, a plurality of extended revoluble formers carried by said platform, a run-way within which said platform is movable, fixed means carried by said run-way revolving said formers when said platform is moved within said run-way, chain means for moving said platform, tension means for said chain, a revoluble inclined brush abuttable upon said formers during the passage of said platform through said run-way, means for revolving said brush, means for varying the height and inclination of said brush and means for fixing said brush in said varying positions of height and inclination.

11. In a bead forming device, in combination, a movable platform, a plurality of extended revoluble formers carried by said platform, a run-way within which said platform is movable, a pinion carried by each said former, a fixed rack carried by said run-way meshable with said pinions revolving said formers when said platform is moved within said run-way, chain means for moving said platform, tension means for said chain and a revoluble inclined brush abuttable upon said former during the passage of said platform through said run-way, means for revolving said brush, means for varying the height and inclination of said brush and means for fixing said brush in said varying positions of height and inclination.

12. In a bead forming device, in combination, a movable platform, a plurality of extended revoluble formers carried by said platform, a run-way within which said platform is movable, a pinion carried by each of said former, a resilient rack carried by said run-way meshable with said pinions revolving said formers when said platform is moved within said run-way, chain means for moving said platform, tension means for said chain, and a revoluble inclined brush abuttable upon said former during the passage of said platform through said run-way and means for revolving said brush.

13. In a bead forming device, in combination, a movable platform, a plurality of extended revoluble formers carried by said platform, a run-way within which said platform is movable, a pinion carried by each said former, a resilient rack carried by said run-way meshable with said pinions revolving said formers when said platform is moved within said run-way, chain means for moving said platform, tension means for said chain and a revoluble inclined brush abuttable upon said former during the passage of said platform through said run-way, means for revolving said brush, means for varying the height and inclination of said brush and means for fixing said brush in said varying positions of height and inclination.

14. In a bead forming device, in combination, a movable platform, a plurality of extended revoluble formers carried by said platform, a run-way within which said platform is movable, a pinion carried by each said former, resilient racks carried by said run-way meshable with said pinions revolving said formers when said platform is moved within said run-way, fixed racks carried by said run-way meshable with said pinions revolving said formers when said platform is moved within said run-way, chain means for moving said platform, tension means for said chain, a revoluble inclined brush abuttable upon said formers during the passage of said platform through said run-way and means for revolving said brush.

15. In a bead forming device, in combination, a movable platform, a plurality of extended revoluble formers carried by said platform, a run-way within which said platform is movable, a pinion carried by each said former, resilient racks carried by said run-way meshable with said pinions revolving said formers when said platform is moved within said run-way, fixed rack carried by said run-way meshable with said pinions revolving said formers when said platform is moved within said run-way, chain means for moving said platform, tension means for said chain, a revoluble inclined brush abuttable upon said formers during the passage of said platform through said run-way, means for revolving said brush, means for varying the height and inclination of said brush and means for fixing said brush in said varying positions of height and inclination.

Signed at New York city, in the county of New York and State of New York, this 5th day of February, 1929.

YERVANT H. KURKJIAN.